UNITED STATES PATENT OFFICE.

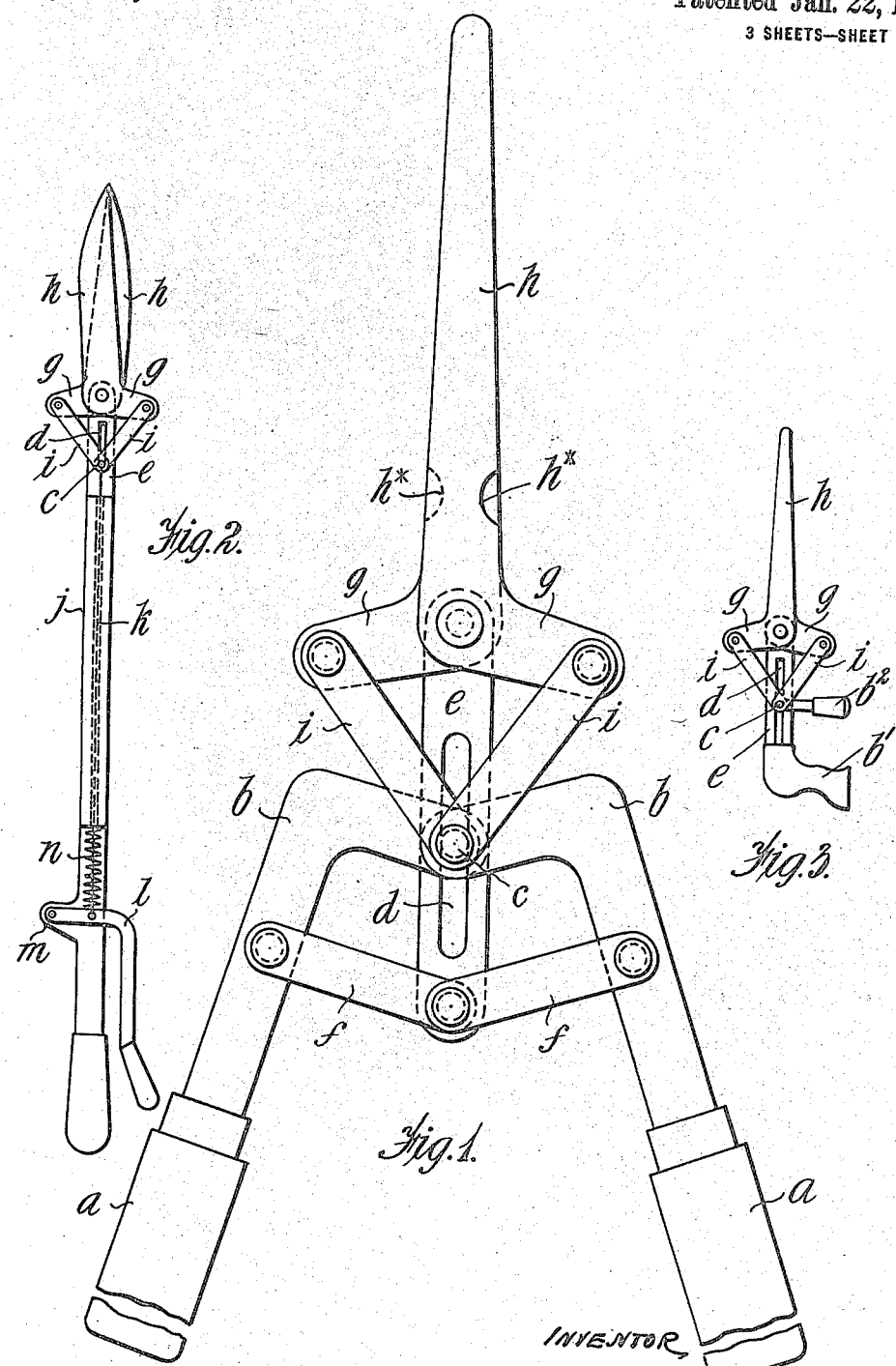

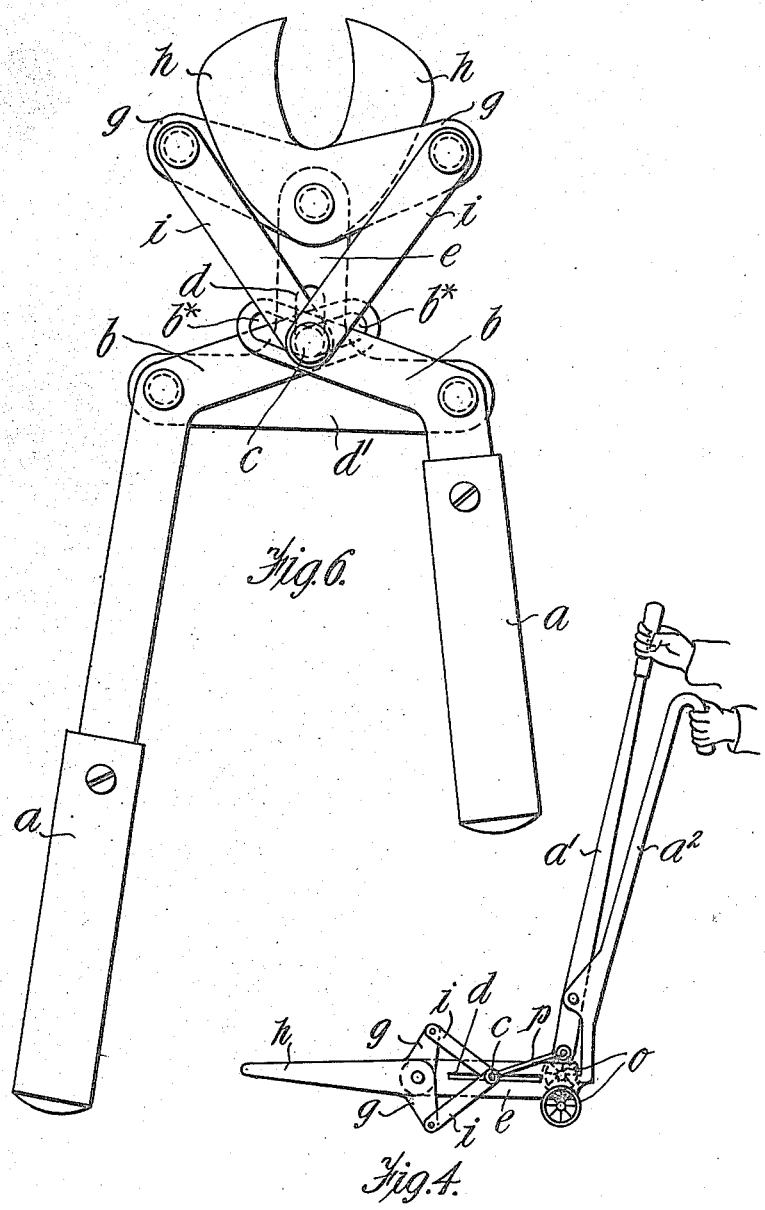

RICHARD JOHN SOUTHWOOD, OF UPPER NORWOOD, ENGLAND.

GARDEN-SHEARS, PRUNER, AND THE LIKE.

1,254,284.

Specification of Letters Patent. Patented Jan. 22, 1918.

Application filed January 10, 1917. Serial No. 141,631.

*To all whom it may concern:*

Be it known that I, RICHARD JOHN SOUTHWOOD, a subject of the King of Great Britain and Ireland, and resident of Upper Norward, county of Surrey, England, have invented a certain new and useful Improvement in Garden-Shears, Pruners, and the like, of which the following is a specification.

The present invention relates to garden shears, pruners and the like cutters, and has for its object to obtain greater leverage, ease in working, and, in the case of shears and one arrangement of cutters, a two-way cutting action, that is to say, the blades cut both on the outward and inward movement of the handles.

With these objects in view, the invention consists in forming the blades of an L-shape, pivoted together and with their short arms extending in opposite directions, the pivot of the blades being mounted at the outer end of a slotted and centrally disposed bar extending toward the handles, said handles, which are curved or cranked at their outer ends, being operably connected to the blades by an arrangement of toggles, or in lazy-tongs fashion.

For a clear understanding of the present invention reference is to be had to the following description and accompanying sheets of drawings, in which:—

Figure 1 is a view of a garden shears which cuts both ways.

Fig. 2 is a view of a tree and like pruner which cuts only one way.

Fig. 3 is a view of a two-way cutting pruner.

Fig. 4 is a view of a shears mounted on wheels.

Fig. 6 is a view of a one-way twig or wire cutter.

Like letters of reference indicate corresponding parts in the several figures.

Figure 5:
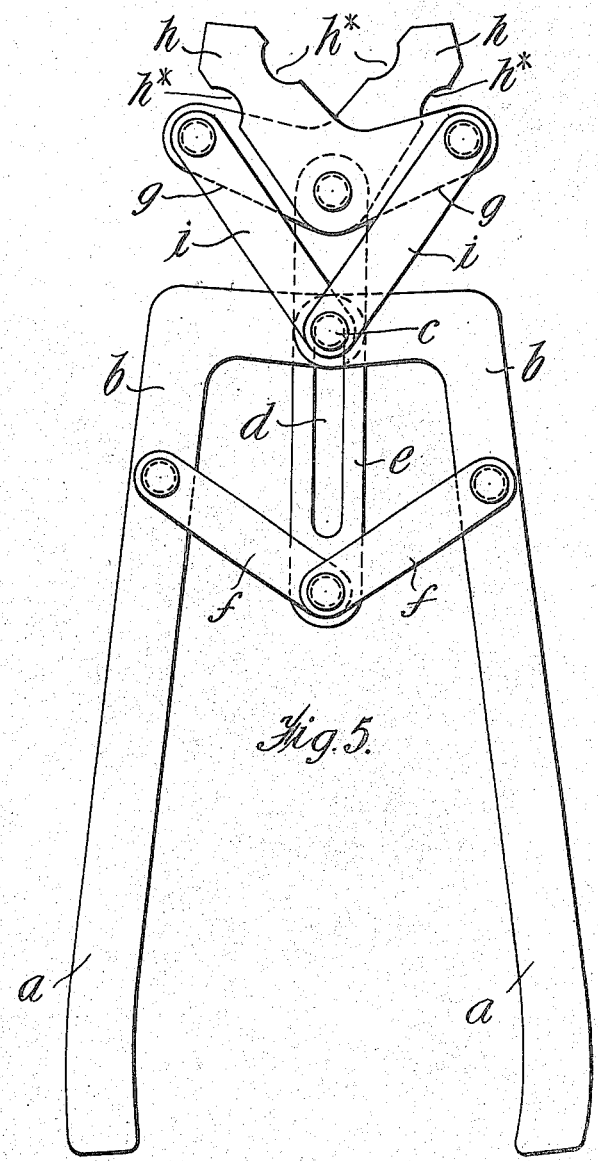
Fig. 5 is a view of a two-way twig or wire cutter.

In carrying out the invention, and dealing first with garden shears, each handle $a$—Fig. 1—is provided with a cranked handle bar $b$ pivotally mounted at its outer end on a stud $c$ capable of sliding motion in the slot $d$ of the centrally disposed bar $e$, and in the length of each handle bar $b$ there is pivoted thereto one end of a short link $f$, the other end of said link $f$ being pivotally mounted on the inner end of the central bar $e$. To the outer end of the short arm $g$ of each blade $h$ there is pivoted one end of a short link $i$, which by its other end is pivotally mounted on the beforementioned slidable stud $c$, which stud $c$ when the shears are in normal position, viz:—blades closed, is located centrally in the length of the slot $d$ in the central bar $e$, to the outer end of which the blades are pivotally connected.

If, now, the handles $a$ be moved outward, the handle bars $b$ swinging on the links $f$, the stud $c$ rides down to the end of the slot $d$ and in so doing, by means of the links $i$ pivoted to said stud $c$, pulls the short arms $g$ of the blades downward and inward, opening out the blades. On the handles being now moved inward, the stud $c$ rides up the slot $d$ to the center thereof, pushing, by means of the aforesaid links $i$, the short arms $g$ outward and upward, bringing the blades together, thus making the cut on the inward movement of the handles. Further and the complete inward movement of said handles now causes the stud $c$ to travel to the upper end of the slot $d$, pushing the ends of the short arms $g$ higher up, opening out the blades which will now have crossed one another.

An outward movement of the handles will now cause the stud to ride down the slot to the middle thereof, bringing the blades together again, making the second cut, or cut on the outward movement of the handles. Further and the complete outward movement of the handles will now cause the stud to again move to the bottom of the slot, opening out the blades which will have thus re-crossed each other, which blades, as will be understood, must each be sharpened on both edges, one or both of said blades, if desired, being provided with a notch $h^*$ to enable small twigs and wire to be cut, thus combining in one implement shears and cutter.

When applying the invention to tree and like pruners, the handles and links connecting them to the central slotted bar $e$ are dispensed with, and said central bar $e$ is—as shown in Fig. 2—attached to the top end of a standard, pole or long-arm $j$, which standard, pole or long-arm $j$ is hollow or provided with a passage for the reception therethrough of a wire or rod $k$ whose upper end is connected to the lever $l$ pivoted to a bracket $m$ or the like toward the lower end of the standard, pole or long-arm $j$, a tension spring n normally tending to keep the blades open, the closing of or the cutting action of said blades being effected by operating the lever l, the blades only cutting one way, viz:—on the downward movement of the wire or rod k.

When the invention is applied to a two-way cutting pruner, the bar e—Fig. 3—is attached to a curved hand grip b' and the blades, opened, crossed, re-crossed and closed by the to an fro movement of the handle b² which is attached to the stud c, slidable in the slot d of the bar e.

To enable grass to be cut without having to bend or stoop, the slotted bar e—Fig. 4—is mounted on wheels o and the slidable stud c connected by a link, rod or other suitable device p to the lower end of a handled lever or rod a' pivotally mounted on a handle rod a² fixedly secured to the rear end of the slotted bar e so that by rocking said lever a' to and fro the blades h are caused to open and close in the manner set forth with reference to the shears shown in Fig. 1.

Although it is preferable that the twig or wire cutter be combined with the shears, yet said twig or wire cutter may form a separate implement, and such an arrangement is shown in Fig. 5. In this case the blades h are cut down to form stub or short jaws each provided with two notches h*, forming a two-way cutter, and as the arrangement of links, slotted bar, cranked handles and the working is precisely the same as for the shears described with reference to Fig. 1. further description is deemed unnecessary.

In Fig. 6 is shown a one-way cutter for twigs and wire. In this case the cranked handle bars b instead of being connected to the central slotted bar e by means of links as in the previous arrangement shown in Fig. 5, are now pivotally mounted on to the slotted bar, which for this purpose is provided at the bottom with a cross bar d' to which said cranked handle bars are pivoted, and to allow of the upward and downward movements of the cranked ends, the same are provided with slots b* in which takes the slidable stud c, the links i connecting the short arms of the L-shaped blades, which have curved cutting edges, pivoting on said slidable stud as in the previous example. The handles a are adjustably mounted on the handle bars b so that the length of the handle as a whole may be lengthened to obtain increased leverage, or to lessen the length; further, if desired, one of the handle bars b may be so constructed and arranged as to be fitted on to a rifle barrel.

Having now described my invention, what I claim as new and desire to secure by Letters Patent of the United States is:—

1. A device of the class described including a member having a slot, a pair of substantially L-shaped blades having opposite cutting edges and pivotally mounted on said member, links pivotally connected to the short arms of the L-shaped blades, a stud pivotally connecting the ends of the links and located in the central part of the slot when the blades are in matching relation, and means for reciprocating the stud to opposite sides of the center of the slot to cause the opposite cutting edges of the blades to alternately come into crossing relation.

2. A device of the class described including a bar having a slot, a pair of cutting blades having opposite cutting edges and pivotally connected by a common pivot to one end of said bar, links loosely connected with the cutting blades, a common pivot element for the other end of said links normally disposed in the middle of the slot in the bar, and means for shifting said common pivot in the slot to alternately bring the opposite cutting edges of the blades into crossing relation.

3. A device of the class described including a pair of cutting blades having a cutting edge at both sides thereof, members loosely connected with said blades and having a common point of connection, and means for shifting the connected parts of said members to one side or the other of the position the same occupies when the blades are in register to bring the opposite cutting edge portions of the latter alternately into shearing relation.

4. A device of the class described including a bar having a slot, a pair of angular cutting blades pivotally connected by a common pivot to one end of said bar, links loosely connected with one of the arms of the angular cutting blades, a common pivot element for the other end of said links disposed in said slot of the bar, and angular handle elements each having link connections with the end of the slotted bar opposite the latter's connection with the blades, said handle elements also being loosely connected with the common pivot for the said links.

5. A device of the class described including a bar having a slot, a pair of angular blades each having a cutting edge at both sides thereof and pivotally connected to one end of said bar, links loosely connected with one of the arms of the said blades, a common pivot element for the other ends of said links disposed in said slot, handle members having hand grip portions and crank portions, and the latter portions of said handles being connected with the pivot element in the slot, and links connecting the intermediate portions of said handles and the end of the bar opposite the blades.

6. A device of the class described including a bar having a slot, a pair of angular cutting blades pivotally connected by a common pivot to one end of said bar, links loosely connected with one of the arms of the angular cutting blades, a common pivot element for the other end of said links disposed in the slot of the bar, and angular handle elements pivotally connected with the bar opposite the latter's connection with the blades, and said handle elements also being loosely connected with the common pivot for said links.

7. A device of the class described including a bar having a slot, a pair of angular cutting blades pivotally connected by a common pivot to one end of said bar, links loosely connected with one of arms of the angular cutting blades, a common pivot element for the other end of said links disposed in said slot of the bar, and handle means pivotally connected with the bar and also with the common pivot element in the slot.

In testimony whereof I have affixed my signature this 22nd day of December 1916.

RICHARD JOHN SOUTHWOOD.